United States Patent
Quick, Jr.

(10) Patent No.: US 9,584,243 B2
(45) Date of Patent: Feb. 28, 2017

(54) ORTHOGONAL MODULATION USING M-SEQUENCES AND HADAMARD TRANSFORMS

(71) Applicant: QUALCOMM Incorporated, San Diego, CA (US)

(72) Inventor: Roy Franklin Quick, Jr., San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 273 days.

(21) Appl. No.: 14/167,391

(22) Filed: Jan. 29, 2014

(65) Prior Publication Data

US 2015/0215064 A1    Jul. 30, 2015

(51) Int. Cl.
*H04J 11/00*    (2006.01)
*H04L 27/26*    (2006.01)
(Continued)

(52) U.S. Cl.
CPC ....... *H04J 11/0063* (2013.01); *H04J 13/0025* (2013.01); *H04J 13/0048* (2013.01);
(Continued)

(58) Field of Classification Search
CPC ......... H03M 13/11; H03M 13/15; H04B 1/00; H04B 1/69; H04B 1/707; H04B 7/00;
(Continued)

(56) References Cited

U.S. PATENT DOCUMENTS 5,471,497 A * 11/1995 Zehavi ................... H04B 1/707
                                                       375/142
6,442,152 B1 * 8/2002 Park ................... H04W 72/0466
                                                       370/320

(Continued)

FOREIGN PATENT DOCUMENTS

FR    WO2013/120882 A1 * 8/2013 ............... H04B 1/69

OTHER PUBLICATIONS

M. Schnell, "Hadamard Codewords as Orthogonal Spreading Sequences in Synchronous DS CDMA Systems for Mobile Radio Channels" 1994, IEEE.*

(Continued)

*Primary Examiner* — Shawkat M Ali
(74) *Attorney, Agent, or Firm* — Holland & Hart LLP

(57) ABSTRACT

Methods, systems, and devices are described for orthogonal modulation of signals using maximal length sequences and Hadamard transforms. Modulation symbols to be transmitted are arranged into sequences indexed from 1 to $2^n-1$ for some integer n. A constant is added to the beginning of each sequence, which is then multiplied by a Hadamard matrix of size $2^n \times 2^n$. The resulting sequences will be orthogonal and will have a first value of zero. The first value is discarded, and the sequence are reordered and associated with m-sequences. The signal is then transmitted. A cyclic prefix may also be transmitted. Upon receiving the transmission, a receiver may discard the cyclic prefix or use it for channel equalization. The receiver may then reorder the received signal, insert a zero, apply the $2^n \times 2^n$ Hadamard transform, (Continued)

discard the zero, and order the sequences again according to the index to retrieve the data.

18 Claims, 13 Drawing Sheets

(51) Int. Cl.
  *H04L 25/02* (2006.01)
  *H04L 25/03* (2006.01)
  *H04J 13/00* (2011.01)
  *H04J 13/10* (2011.01)
(52) U.S. Cl.
  CPC ........ *H04J 13/102* (2013.01); *H04L 25/0204* (2013.01); *H04L 25/0224* (2013.01); *H04L 25/03006* (2013.01); *H04L 27/2627* (2013.01); *H04L 2025/03796* (2013.01)
(58) Field of Classification Search
  CPC .... H04B 7/02; H04B 7/216; H04J 1/08; H04J 3/06; H04J 11/00; H04J 11/0063; H04J 113/00; H04J 113/0025; H04J 113/0048; H04J 113/10; H04J 113/102; H04K 1/10; H04L 25/0204; H04L 25/0224; H04L 25/03006; H04L 27/00; H04L 27/2627; H04L 27/28
  USPC ............... 370/206, 209, 335, 341, 342, 350; 375/130, 141, 146, 260, 267, 295
  See application file for complete search history.

(56) References Cited

U.S. PATENT DOCUMENTS

| | | | | |
|---|---|---|---|---|
| 6,483,828 | B1* | 11/2002 | Balachandran | H04J 13/004 370/342 |
| 6,735,185 | B1* | 5/2004 | Noneman | H04J 13/102 370/335 |
| 7,590,169 | B2 | 9/2009 | Gaal | |
| 7,881,360 | B2* | 2/2011 | Ketchum | H04J 13/0048 370/209 |
| 2002/0122398 | A1* | 9/2002 | Jou | H04B 1/707 370/335 |
| 2005/0135457 | A1* | 6/2005 | Molisch | H04B 1/7176 375/130 |
| 2005/0175070 | A1* | 8/2005 | Grob | H04L 5/026 375/141 |
| 2006/0050625 | A1* | 3/2006 | Krasner | G01S 1/04 370/208 |
| 2006/0098752 | A1* | 5/2006 | Song | H04L 27/2601 375/260 |
| 2008/0260007 | A1 | 10/2008 | Sayeed | |
| 2008/0273522 | A1 | 11/2008 | Luo et al. | |
| 2009/0122897 | A1* | 5/2009 | Belogolovy | H04L 1/0612 375/267 |
| 2010/0054211 | A1* | 3/2010 | Gaal | H04J 13/0025 370/335 |
| 2010/0074343 | A1* | 3/2010 | Gaal | H04L 27/261 375/259 |
| 2010/0098042 | A1 | 4/2010 | Dent | |
| 2010/0272158 | A1* | 10/2010 | Lakkis | H04B 1/707 375/146 |
| 2011/0239084 | A1* | 9/2011 | Abbasfar | G06F 11/1004 714/758 |
| 2015/0003499 | A1* | 1/2015 | Boutillon | H04B 1/707 375/146 |

OTHER PUBLICATIONS

A. Lempel, "Maximal Families of Bent Sequences", 1982, IEEE.*
Cohn et al., "On Fast M-Sequence Transforms," IEEE Transactions on Information Theory, Jan. 1977, pp. 135-137, vol. 23, Iss: 1, XP007919571, Institute of Electrical and Electronics Engineers.
Forney, "Coding and Its Application in Space Communications," IEEE Spectrum, Jun. 1970, pp. 47-58, vol. 7, Iss: 6, XP000761578, Institute of Electrical and Electronics Engineers.
ISA/EPO, International Search Report and Written Opinion of the International Searching Authority, Int'l App. No. PCT/US2015/011908, Apr. 1, 2015, European Patent Office, Rijswijk, NL, 10 pgs.
Bernhard M., et al., Multicarrier Transmission using Hadamard Transform for Optical Communications, Photonic Networks, 14. 2013 ITG Symposium, 2013, pp. 1-5.
Ping L., Code-shift Division Multiple Access for Cellular Mobile, IEEE 47th Vehicular Technology Conference, 1997, vol. 1, pp. 377-381.

* cited by examiner

ORTHOGONAL MODULATION USING M-SEQUENCES AND HADAMARD TRANSFORMS

BACKGROUND

The following relates generally to wireless communication, and more specifically to orthogonal modulation of signals using maximal length sequences (m-sequences) and Hadamard transforms. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems. The following description may be used in conjunction with one of these technologies, or it may be used in a new system. A wireless system using these techniques may be referred to as orthogonal sequence division multiple access (OSDMA).

Generally, a wireless multiple-access communications system may include a number of base stations, each simultaneously supporting communication for multiple mobile devices. Base stations may communicate with mobile devices on downstream and upstream links. Each base station has a coverage range, which may be referred to as the coverage area of the cell. In some cases, a base station may transmit data to more than one mobile device at a time. A base station may also receive data from more than one mobile device. This may result in interference between communications with the different mobile devices. Interference may also arise when transmissions take more than one path to a receiver. Multipath propagation may result in a delayed and/or distorted version of a signal interfering with the signal that arrives via the most direct path. Communication between a base station and a mobile device may be one directional (e.g., broadcasting information from a base station to a mobile device) or two-directional (e.g., transmitting information back and forth between a base station and a mobile device).

In some cases, data may be processed so that different communication channels or different devices use orthogonal resources to reduce interference. The amount of processing power required may depend on the method used to transform the signal. For example, OFDMA systems apply a Fourier transform to create signals using orthogonal frequency resources. A fast Fourier transform (FFT) processor may perform on the order of $N \cdot \log N$ multiplication operations to transform a modulation symbol consisting of N elements. A cyclic prefix may be appended to the signal to reduce inter-symbol interference (ISI) due to multipath propagation. Alternatively, a fast Hadamard transform (FHT) may be used to generate a signal consisting of orthogonal sequences. An FHT processor may transform a signal of size N using on the order of $N \cdot \log N$ addition or subtraction operations, which may be more efficient than using multiplication operations. However, using an FHT produces a signal that may not be compatible with the use of a cyclic prefix, and may not have desirable cross-correlation and auto-correlation properties.

SUMMARY

The described features generally relate to one or more improved systems, methods, and/or apparatuses for orthogonal modulation of signals using maximal length sequences and Hadamard transforms. Modulation symbols to be transmitted are arranged into sequences indexed from 1 to $2^n-1$ for some integer n. A constant is added to the beginning of each sequence, which is then multiplied by a Hadamard matrix of size $2^n \times 2^n$. The resulting sequences will be orthogonal and will have a first value of zero. The first value is discarded, and the sequences are reordered and associated with m-sequences. The signal is then transmitted. A cyclic prefix may also be transmitted. Upon receiving the transmission, a receiver may discard the cyclic prefix or use it for channel equalization. The receiver then reorders the received signal, inserts a zero, applies the Hadamard transform and reorders the sequences again to retrieve the data. A pilot signal may also be transmitted along with the data for use in channel estimation.

A method of communication using orthogonal modulation is described, comprising: associating a set of data with an ordered set of sequences to produce a first set of modulation sequences; appending a constant to each sequence in the first set of modulation sequences to produce a second set of modulation sequences; associating each of the second set of modulation sequences with a set of orthogonal sequences to produce a third set of modulation sequences; discarding an element of each sequence in the third set of modulation sequences and associating the remaining elements of each sequence in the third set of modulation sequences with a sequence from a set of pseudorandom binary sequences to produce a fourth set of modulation sequences; and transmitting a signal comprising the fourth set of modulation sequences.

An apparatus for communication using orthogonal modulation is also described, comprising: means for associating a set of data with an ordered set of sequences to produce a first set of modulation sequences; means for appending a constant to each sequence in the first set of modulation sequences to produce a second set of modulation sequences; means for associating each of the second set of modulation sequences with a set of orthogonal sequences to produce a third set of modulation sequences; discarding an element of each sequence in the third set of modulation sequences and means for associating the remaining elements of each sequence in the third set of modulation sequences with a sequence from a set of pseudorandom binary sequences to produce a fourth set of modulation sequences; and means for transmitting a signal comprising the fourth set of modulation sequences.

Another apparatus for communication using orthogonal modulation is also described, comprising: a processor; memory in electronic communication with the processor; and instructions stored in the memory, the instructions being executable by the processor to: associate a set of data with an ordered set of sequences to produce a first set of modulation sequences; append a constant to each sequence in the first set of modulation sequences to produce a second set of modulation sequences; associate each of the second set of modulation sequences with a set of orthogonal sequences to produce a third set of modulation sequences; discard an element of each sequence in the third set of modulation sequences and associate the remaining elements of each sequence in the third set of modulation sequences with a sequence from a set of pseudorandom binary sequences to produce a fourth set of modulation sequences; and transmit a signal comprising the fourth set of modulation sequences.

A computer program product for communication using orthogonal modulation is also described, the computer program product comprising a non-transitory computer-readable medium storing instructions executable by a processor to: associate a set of data with an ordered set of sequences to produce a first set of modulation sequences; append a constant to each sequence in the first set of modulation sequences to produce a second set of modulation sequences; associate each of the second set of modulation sequences with a set of orthogonal sequences to produce a third set of modulation sequences; discard an element of each sequence in the third set of modulation sequences and associate the remaining elements of each sequence in the third set of modulation sequences with a sequence from a set of pseudorandom binary sequences to produce a fourth set of modulation sequences; and transmit a signal comprising the fourth set of modulation sequences.

A method, apparatus, and computer program product above are also described, further comprising: applying a Hadamard transform to each of the second set of modulation sequences to produce the third set of modulation sequences. In some cases, each sequence in the ordered set of sequences has a same number of elements. In some cases the set of pseudorandom binary sequences comprises a set of cyclic shift invariant sequences. In somecases, the set of pseudorandom binary sequences comprises a set of maximal length sequences. In some cases the transmitted signal comprises at least one cyclic prefix. In some cases the transmitted signal comprises a pilot signal. In some cases each sequence in the ordered set of sequences comprises a number of elements equal to one less than a power of two. In some cases the transmitted signal is a broadcast signal.

A method, apparatus, and computer program product above are also described, further comprising: transmitting the pilot signal at an offset for channel estimation. A method, apparatus, and computer program product above are also described, further comprising: transmitting the signal using more than one antenna.

A method of communication using orthogonal modulation is described, comprising: receiving a signal comprising a first set of modulation sequences that correspond with a set of pseudorandom binary sequences; appending a constant to each sequence in the first set of modulation sequences to produce a second set of modulation sequences; associating each of the second set of modulation sequences with a set of orthogonal sequences to produce a third set of modulation sequences; discarding an element of each sequence in the third set of modulation sequences to produce a fourth set of modulation sequences; and retrieving a set of data associated with the fourth set of modulation sequences.

An apparatus for communication using orthogonal modulation is described, comprising: means for receiving a signal comprising a first set of modulation sequences that correspond with a set of pseudorandom binary sequences; means for appending a constant to each sequence in the first set of modulation sequences to produce a second set of modulation sequences; means for associating each of the second set of modulation sequences with a set of orthogonal sequences to produce a third set of modulation sequences; means for discarding an element of each sequence in the third set of modulation sequences to produce a fourth set of modulation sequences; and means for retrieving a set of data associated with the fourth set of modulation sequences.

Another apparatus for communication using orthogonal modulation is described, comprising: a processor; memory in electronic communication with the processor; and instructions stored in the memory, the instructions being executable by the processor to: receive a signal comprising a first set of modulation sequences that correspond with a set of pseudorandom binary sequences; append a constant to each sequence in the first set of modulation sequences to produce a second set of modulation sequences; associate each of the second set of modulation sequences with a set of orthogonal sequences to produce a third set of modulation sequences; discard an element of each sequence in the third set of modulation sequences to produce a fourth set of modulation sequences; and retrieve a set of data associated with the fourth set of modulation sequences.

A computer program product for communication using orthogonal modulation is described, the computer program product comprising a non-transitory computer-readable medium storing instructions executable by a processor to: receive a signal comprising a first set of modulation sequences that correspond with a set of pseudorandom binary sequences; append a constant to each sequence in the first set of modulation sequences to produce a second set of modulation sequences; associate each of the second set of modulation sequences with a set of orthogonal sequences to produce a third set of modulation sequences; discard an element of each sequence in the third set of modulation sequences to produce a fourth set of modulation sequences; and retrieve a set of data associated with the fourth set of modulation sequences.

The method, apparatus and computer program product above are described, further comprising: applying a Hadamard transform to each of the second set of modulation sequences to produce the third set of modulation sequences. In some cases the set of pseudorandom binary sequences comprises a set of cyclic shift invariant sequences. In some cases the set of pseudorandom binary sequences comprises a set of maximal length sequences. In some cases the received signal comprises at least one cyclic prefix. In some cases the signal is received using more than one antenna. In some cases the received signal comprises a pilot signal. In some cases the received signal is a broadcast signal.

The method, apparatus, and computer program above are described, further comprising: discarding the at least one cyclic prefix. The method, apparatus, and computer program above are described, further comprising: estimating channel quality using the pilot signal. The method, apparatus, and computer program above are described, further comprising: applying frequency equalization using the pilot signal. In some cases applying frequency equalization comprises using a circulant matrix.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Transmitting data associated with m-sequences may result in better cross-correlation and auto-correlation properties in the presence of multipath propagation than using the orthogonal sequences of a Hadamard matrix. Processing the data with the Hadamard matrix may enable efficient transmission and data retrieval. Using both m-sequences and the Hadamard transform may enable a reduction in the complexity of the transmitter and/or receiver and an improved signal to noise ratio.

There is a one-to-one correspondence between Walsh sequences, which form the rows of the Hadamard matrices, and time shifts of m-sequences. Time shifts of the m-sequences may be used in a manner similar to how tones, or subcarriers, are used to differentiate different data channels. By reordering the received m-sequences, the Hadamard transform may be used to recover the data. Pilot signals, cyclic prefixes and/or guard shifts may be used to allow channel estimation.

Hadamard sequences (or Walsh sequences) are orthogonal, but m-sequences are not orthogonal. Also, m-sequences have one fewer element than the associated Walsh sequences. To preserve the correspondence between an m-sequence of length 2n−1 and the Hadamard/Walsh sequence, the first value (sometimes referred to as the DC value) of the Hadamard sequence may be discarded before transmission. Orthogonality may be preserved if the discarded DC value of the transmitted signal is zero. The same DC value can be prepended at the receiver.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
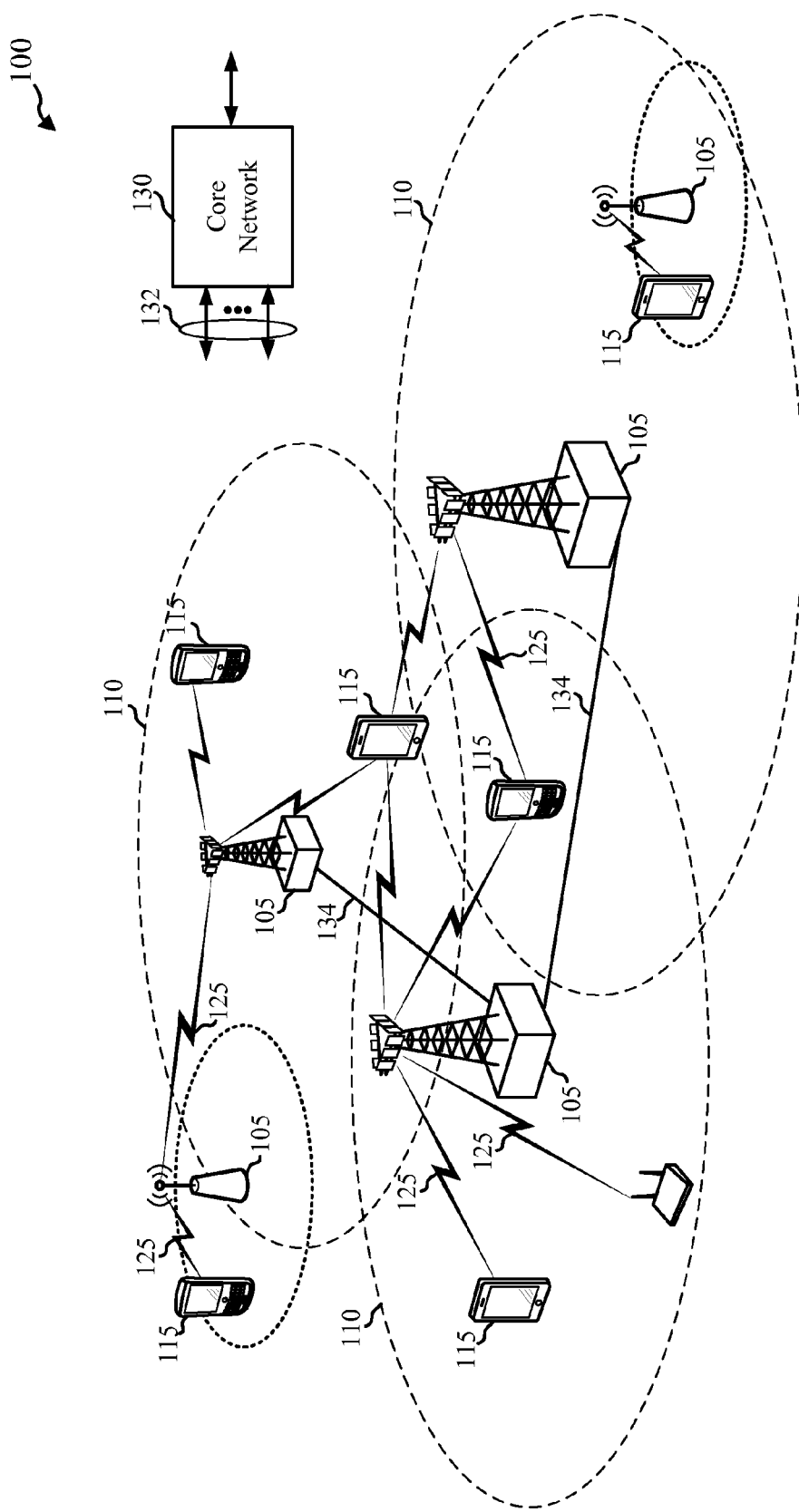
FIG. 1 shows a diagram of an example wireless communications system.

Referring first to FIG. 1, a diagram illustrates an example of a wireless communications system 100. The system 100 includes base stations (or cells) 105, communication devices 115, and a core network 130. The base stations 105 may communicate with the communication devices 115 under the control of a base station controller (not shown), which may be part of the core network 130 or the base stations 105 in various embodiments. Base stations 105 may communicate control information and/or user data with the core network 130 through backhaul links 132. In embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

In some cases, the communication links 125 may experience interference due to transmission of signals to other communication devices 115, to naturally occurring noise, or due to propagation of wireless signals along more than one path. An example of a cause of multipath propagation may include signals reflected off buildings and other structures.

The base stations 105 may wirelessly communicate with the devices 115 via one or more base station antennas. The antennas may transmit waveforms that carry information according to a modulation and coding scheme (MCS). The MCS may include, or may be in addition to processing according to one or more mathematical transformations in accordance with the present invention. For example, the data may be sequenced and processed according to a Hadamard transformation.

Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, and/or pico base stations). There may be overlapping coverage areas for different technologies.

In embodiments, the system 100 may include one or more aspects of an LTE/LTE-A network. In LTE/LTE-A networks, the terms evolved Node B (eNB) and user equipment (UE) may be generally used to describe the base stations 105 and devices 115, respectively.

The core network 130 may communicate with the base stations 105 via a backhaul 132 (e.g., S1, etc.). The base stations 105 may also communicate with one another, e.g., directly or indirectly via backhaul links 134 (e.g., X2, etc.) and/or via backhaul links 132 (e.g., through core network 130). The wireless system 100 may support synchronous or asynchronous operation. For synchronous operation, the base stations 105 (or eNBs) may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

The UEs 115 are dispersed throughout the wireless system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The communication links 125 shown in wireless system 100 may include uplink (UL) transmissions from a communication device 115 to a base station 105, and/or downlink (DL) transmissions, from a base station 105 to a communication device 115. The downlink transmissions may also be called forward link transmissions while the uplink transmissions may also be called reverse link transmissions.

Figure 2:
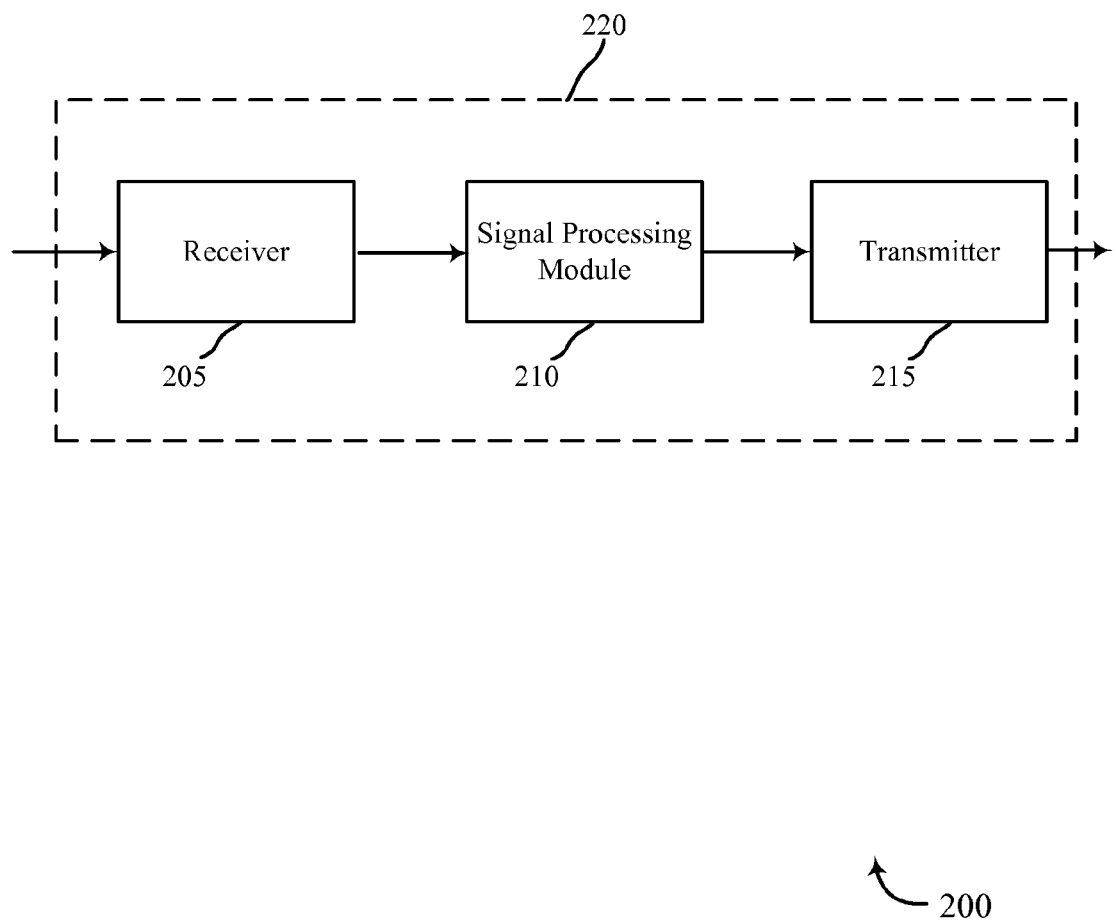
FIG. 2 shows a block diagram of a device for communication using orthogonal modulation in accordance with various embodiments.

Turning next to FIG. 2, a block diagram 200 illustrates a device 220 for communication using orthogonal modulation in accordance with various embodiments. The device 220 may be an example of one or more aspects of a UE 115 or base station 105 described with reference to FIG. 1. The device 220 may include a receiver 205, a signal processing module 210, and/or a transmitter 215. The device 220 may also include a processor (not shown). Each of these components may be in communication with each other.

These components of the device 220 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the device 220.

The receiver 205 may receive information such as packets, user data, and/or control information including synchronization and pilot signals. It may also be means for receiving a signal comprising a set of modulation sequences that correspond with a set of pseudorandom binary sequences. In some cases, the received signal may be a broadcast signal. In other cases, it may be a unicast signal. In some cases, the information is received using more than one antenna associated with the receiver 205. The information may be passed on to the signal processing module 210, and to other components of the device 220. The receiver 205 may include a single antenna, or it may include a plurality of antennas.

The signal processing module 210 may be means for appending a constant to each sequence in a set of modulation sequences, associating each of the modulation sequences with a set of orthogonal sequences, discarding an element of each sequence and then associating the remaining elements of each sequence with a sequence from a set of pseudorandom binary sequences. In one embodiment, the signal processing module applies a Hadamard transform to the set of modulation. Information and instructions may then be passed to a processor (not shown), the receiver 205, the transmitter 215, or other components of the device 220.

The transmitter 215 may be means for transmitting a signal comprising a set of modulation sequences. It may transmit the one or more signals received from the signal processing module 210 or other components of the device 220. In some embodiments, the transmitter 215 may be collocated with the receiver in a transceiver module (not shown). The transmitter 215 may include a single antenna, or it may include a plurality of antennas. The transmitter 215 may also be means for transmitting the pilot signal at an offset for channel estimation.

Figure 3:
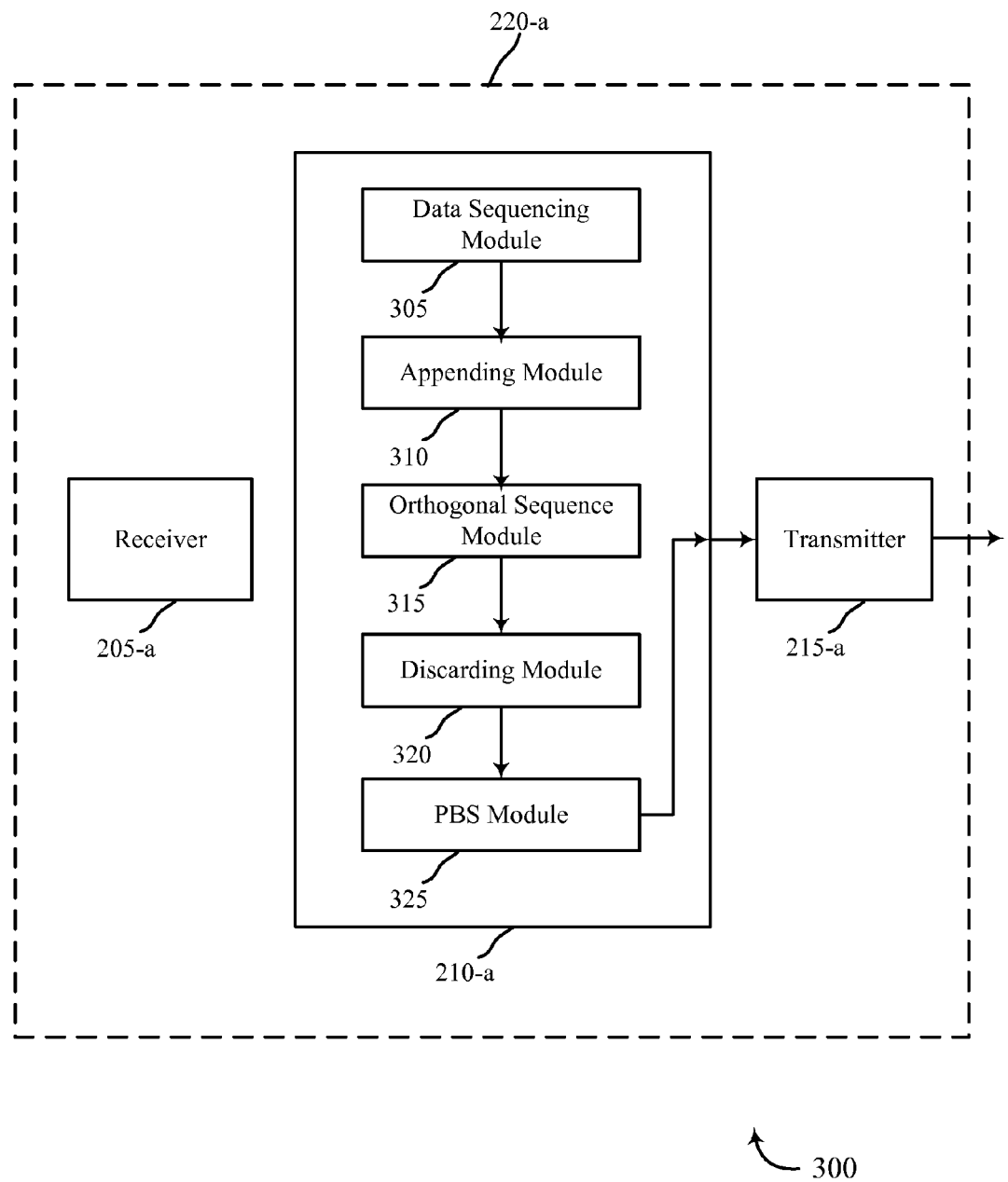
FIG. 3 shows a block diagram of a device for transmitting using orthogonal modulation in accordance with various embodiments.

Turning next to FIG. 3, a block diagram 300 illustrates a device 220-*a* for transmitting using orthogonal modulation in accordance with various embodiments. The device 220-*a* may be an example of one or more aspects of a UE 115 or base station 105 described with reference to FIG. 1. The components of device 220-*a* may also be an example of the components of device 220 with reference to FIG. 2. The device 220-*a* may include a receiver 205-*a*, a signal processing module 210-*a*, and/or a transmitter 215-*a*. The signal processing module 210-*a* may include a data sequencing module 305, an appending module 310, an orthogonal sequence module 315, a discarding module 320, and a pseudorandom binary sequence (PBS) module 325. The device 220-*a* may also include a processor (not shown). Each of these components may be in communication with each other. The receiver 205-*a*, signal processing module 210-*a*, and transmitter 215-*a* may perform the functions of the corresponding modules 210 of FIG. 2.

These components of the device 220-*a* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the device 220-*a*.

The data sequencing module 305 may be means for associating a set of data with an ordered set of sequences to produce a first set of modulation sequences. In some cases, the data sequences will all have the same length. In some cases, they may be binary sequences. In one embodiment, the modulation sequences may have length $2^n-1$, for a positive integer n.

The appending module 310 may be means for appending a constant to each sequence in the first set of modulation sequences to produce a second set of modulation sequences. In one embodiment, this results in sequences of length $2^n$.

The orthogonal sequence module 315 may be means for associating each of the second set of modulation sequences with a set of orthogonal sequences to produce a third set of modulation sequences. In one embodiment, the orthogonal sequence module 315 may apply a Hadamard transform to each of the second set of modulation sequences to produce the third set of modulation sequences. Hadamard matrices may be of size $2^n \times 2^n$, with orthogonal rows of size $2^n$. Hadamard matrices may have elements of value 1 or −1. Walsh sequences may be obtained from the rows of the Hadamard matrix by replacing each value of 1 with a 0, and replacing any value of −1 with a 1. For example, Table 1 below shows the list of 8 ($2^3$) Walsh sequences with 8 elements each. They are ordered according to the 8 3-bit ordering "masks".

TABLE 1

| Mask | Walsh Sequence |
|------|----------------|
| 000  | 00000000       |
| 001  | 01010101       |
| 010  | 00110011       |
| 011  | 01100110       |
| 100  | 00001111       |
| 101  | 01011010       |
| 110  | 00111100       |
| 111  | 01101001       |

The discarding module 320 may be means for discarding an element of each sequence in the third set of modulation sequences to produce a fourth set of modulation sequences.

The PBS module 325 may be means for associating the remaining elements of each sequence in the third set of modulation sequences with a sequence from a set of pseudorandom binary sequences to produce a fourth set of modulation sequences (PBSs). The PBSs may be invariant with respect to cyclic shifts. In one embodiment, the PBSs are maximal length sequences (m-sequences). In other embodiments, the sequences may be Gold sequences, Kasami sequences, or other related sequences that have desirable correlation properties.

As an example, Table 2 below illustrates a set of seven ($2^3-1$) m-sequence time shift states that include all possible 3-bit values (except 000), but are arranged in a different order:

TABLE 2

| Count | M-sequence States |
|-------|-------------------|
| 000   | (none)            |
| 001   | 001               |
| 010   | 010               |
| 011   | 100               |
| 100   | 011               |
| 101   | 110               |
| 110   | 111               |
| 111   | 101               |

The m-sequences of Table 2 are obtained by applying the xor operation of the bits in the state and a mask that can be any nonzero 3-bit number. The seven possible 3-bit masks produce the 7 possible time shifts of the m-sequence.

Table 3 represents the 7 m-sequences that arise from the 7 time-shift values in Table 1. The values in Table 2 are ordered according to the binary value of the mask, but the offset order from Table 1 is listed in the right-hand column:

TABLE 3

| Mask | Sequence | Offset |
|------|----------|--------|
| 001  | 1001011  | 0      |
| 010  | 0101110  | 2      |
| 011  | 1100101  | 6      |
| 100  | 0010111  | 1      |
| 101  | 1011100  | 3      |
| 110  | 0111001  | 4      |
| 111  | 1110010  | 5      |

The relationship between the sequences may be determined by forming a matrix C containing the bits of "count" and a matrix S containing the bits of "state". A Boolean matrix P may be formed which reorders the rows of S to produce C:

$$PS = C \quad (1)$$

Both sides of this equation may be multiplied by the mask vector $\vec{m}$ to get:

$$PS\vec{m} = C\vec{m}, \quad (2)$$

which equals the Walsh sequence for mask $\vec{m}$, minus the initial zero. Adding the initial zero and converting zeroes to ones and ones to negative ones, the Hadamard transform of the result reveals $\underline{m}$.

As an example, for the m-sequences above we may produce the matrix $$P = \begin{bmatrix} 1 & 0 & 0 & 0 & 0 & 0 & 0 \\ 0 & 1 & 0 & 0 & 0 & 0 & 0 \\ 0 & 0 & 0 & 1 & 0 & 0 & 0 \\ 0 & 0 & 1 & 0 & 0 & 0 & 0 \\ 0 & 0 & 0 & 0 & 0 & 0 & 1 \\ 0 & 0 & 0 & 0 & 1 & 0 & 0 \\ 0 & 0 & 0 & 0 & 0 & 1 & 0 \end{bmatrix}, \quad (3)$$

In the case that $\vec{m} = 011$, multiplying by S gives $$S\vec{m} = [\mathbf{1100101}]^T, \quad (4)$$

and multiplying by P gives $$PS\vec{m} = [\mathbf{1100110}]^T, \quad (5)$$

Adding the initial 0 gives [01100110]T, which is equal to the Walsh function generated by $\vec{m}$. The Hadamard sequence is [1 −1 −1 1 1 −1 −1 1]. The associated Hadamard transform is [0 0 0 8 0 0 0 0].

Thus, for up to $2^n-1$ complex modulation symbols (e.g. QPSK, QAM), indexed by i from 1 to $2^n-1$, multiply by the Hadamard sequence for mask i and sum. This may preserve orthogonality at the receiver. In some cases, encoding with Walsh-Hadamard sequences may include associating non-zero indices with the modulation symbols. The value assigned to the zero index may be used to remove the DC value. In some cases, another method of removing the DC value may be used. For example, a set of indices may be selected such that the sum of the values becomes zero.

A fast Hadamard transform (FHT) may be used to generate the result by prepending a zero, reordering the samples from 1 to $2^n-1$ using the inverse matrix $P^{-1}$. Since the first element of the FHT is zero it doesn't need to be transmitted.

In one embodiment, at least one cyclic prefix is added by taking, for example, the last N reordered samples and repeating them prior to the start of the symbol. Transmission may be accomplished in coordination with transmitter 215-a and other components of the device 220-a.

Figure 4:
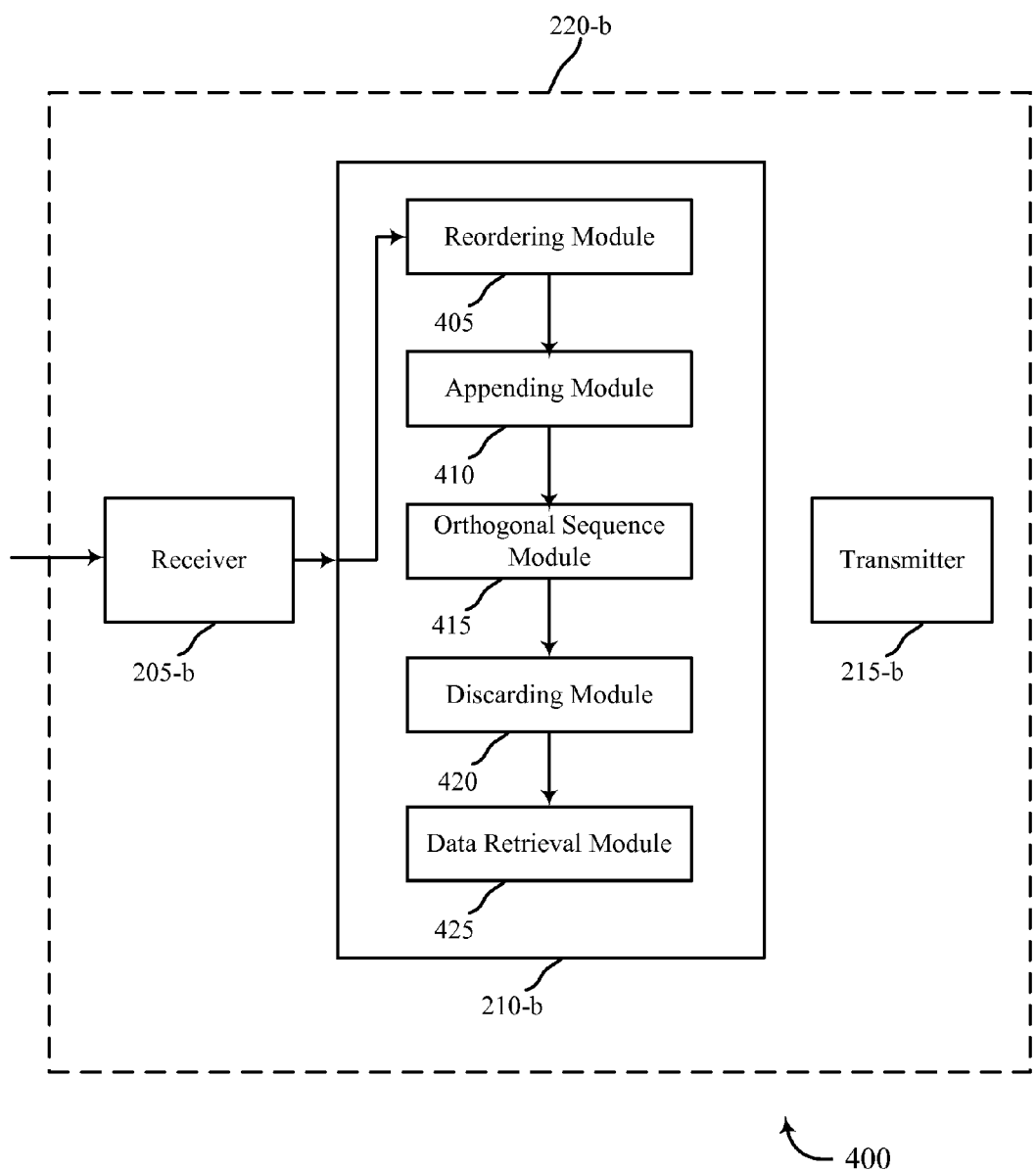
FIG. 4 shows a block diagram of a device for receiving using orthogonal modulation in accordance with various embodiments.

Turning next to FIG. 4, a block diagram 400 illustrates a device 220-b for receiving transmissions using orthogonal modulation in accordance with various embodiments. The device 220-a may be an example of one or more aspects of a UE 115 or base station 105 described with reference to FIG. 1. The components of device 220-b may also be an example of the components of device 220 with reference to FIG. 2 and/or FIG. 3. The device 220-b may include a receiver 205-b, a signal processing module 210-b, and/or a transmitter 215-b. The signal processing module 210-b may include a reordering module 405, an appending module 410, an orthogonal sequence module 415, a discarding module 420, and a data retrieval module 425. The device 220-b may also include a processor (not shown). Each of these components may be in communication with each other. The receiver 205-b, signal processing module 210-b, and transmitter 215-b may perform the functions of the corresponding modules 210 of FIG. 2. They may also perform some or all of the functions of device 220-a of FIG. 3.

These components of the device 220-b may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the device 220-b.

The reordering module 405 may reorder a set of received data sequences to associate from the PBS sequence ordering to the Walsh/Hadamard ordering. This may be done according to the inverse of the process described above with reference to PBS module 325. For example, the matrix P may be used. In one embodiment, the received signal may be composed of m-sequences. The length of the sequences may be $2^n-1$ for some positive integer n.

The appending module 410 may be means for appending a constant to each sequence in the first set of modulation sequences to produce a second set of modulation sequences. In one embodiment, the constant that is appended to each sequence is a zero. This may result in a set of sequences of length $2^n$. In some cases, a cyclic prefix is received and discarded prior to reordering the sequences.

The orthogonal sequence module 415 may be means for associating each of the second set of modulation sequences with a set of orthogonal sequences to produce a third set of modulation sequences. In one embodiment, the module 415 may be means for applying a Hadamard transform to each of the second set of modulation sequences to produce the third set of modulation sequences. This may be done according to the process described above with reference to the orthogonal sequence module 315.

The discarding module 420 may be means for discarding an element of each sequence in the third set of modulation sequences to produce a fourth set of modulation sequences. In one embodiment, this may result in a new set of sequences of length $2^n-1$.

The data retrieval module 425 may be means for retrieving a set of data associated with the fourth set of modulation sequences. Information and instructions may then be passed to a processor (not shown), the receiver 205-b, the transmitter 215-b, or other components of the device 220-b.

Figure 5:
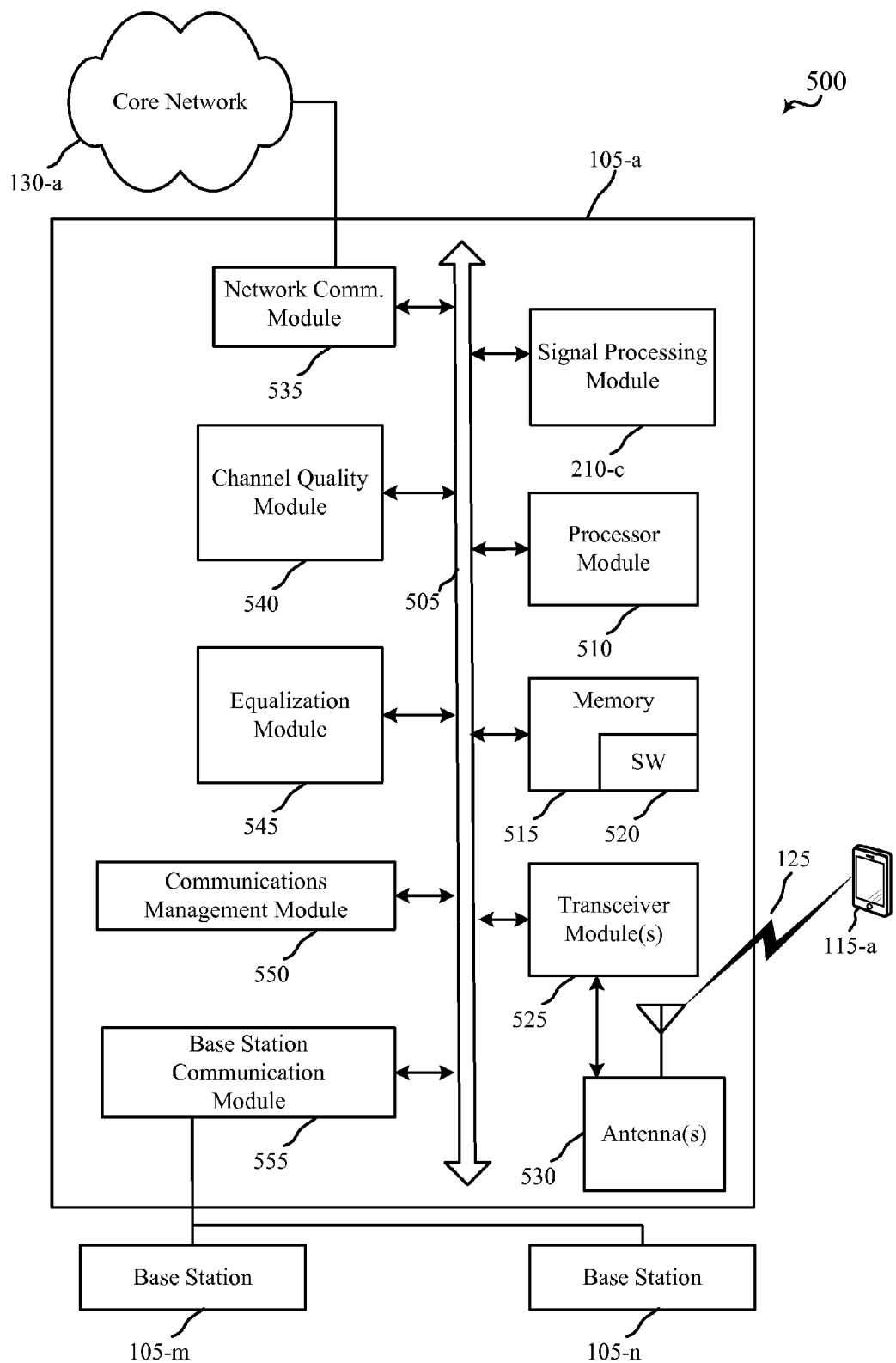
FIG. 5 shows an example of a base station configured for communication using orthogonal modulation in accordance with various embodiments.

Next, FIG. 5 shows a block diagram of an example system 500 configured for communication using orthogonal modulation in accordance with various embodiments. This system 500 may be an example of aspects of the system 100 depicted in FIG. 1. The system 500 includes an base station 105-c configured for communication with UEs 115 over wireless communication links 125. The base station 105-a may be capable of receiving communication links 125 from other base stations (not shown). The base station 105-a may be, for example, a base station 105 as illustrated in FIG. 1. It may also be an example of device 220 in the embodiments of devices 220-a and/or 220-b with reference to FIGS. 2-4.

The base station 105-a may also include a signal processing module 210-c that may be configured according to the signal processing module 210, 210-a, and/or 210-b of FIGS. 2-4. The signal processing module 210-c may be used to process data to be transmitted to a UE 115-a, or received from the UE 115-a. It may process data in coordination with the processor module 510, the transceiver module2 525 and other components of base station 105-a.

The base station 105-a may also include a channel quality module 540 that may be used to estimate the quality of a transmission link 125 with UE 115-a. Channel estimation may involve receiving a constant modulation value for some offset (e.g., 0). This may be a pilot signal. The modulation values may be zero for all indices whose time shifts are N before and N after the pilot, for some pre-determined value N. This ensures that the N offsets following the pilot only contain multipath delays of the pilot. The offset may be time-reversed, so that a channel delay results in an earlier shift of a data sequence.

The base station 105-a may also include an equalization module 545. The equalization module 545 may be means for equalizing received channels. Based on the cyclic prefix, a multipath delay may have the effect of multiplying the transmit signal by a circulant matrix M:

$$r=Mx+n \tag{6}$$

If the delay is nonzero and of length <N, M may have column rank at least the dimension of M, minus N−1. If the last N offsets are spaced with a guard, the last N−1 columns of M may be irrelevant. If L is defined as all but the last N−1 columns of M, then a least-squares estimate of the transmitted signal may be given by:

$$\hat{x}=(L^H L)^{-1} L^H r \tag{7}$$

The circulant matrix M may be generated by the equalization module 545 in coordination with the channel quality module 540. The channel quality module may may estimate one or more multipath delay parameters based on receiving one or more delayed pilot signals with different received power. These parameters may be used to generate M. A guard space between the pilot signal and the data signal may be used to prevent the delayed pilot signals from interfering with the modulation symbols and vice versa.

In some cases, the base station 105-a may have one or more wired backhaul links. The base station 105-a may be, for example, a macro eNB 105 having a wired backhaul link (e.g., S1 interface, etc.) to the core network 130-a. The base station 105-a may also communicate with other base stations 105, such as base station 105-m and base station 105-n via inter-base station communication links (e.g., X2 interface, etc.). Each of the base stations 105 may communicate with UEs 115 using the same or different wireless communications technologies. In some cases, base station 105-a may communicate with other base stations such as 105-m and/or 105-n utilizing base station communication module 555. In some embodiments, base station communication module 555 may provide an X2 interface within an LTE/LTE-A wireless communication network technology to provide communication between some of the base stations 105. In some embodiments, base station 105-a may communicate with other base stations through core network 130-a. In some cases, the base station 105-a may communicate with the core network 130-a through network communications module 535.

The base station 105-a may include antennas 530, transceiver modules 525, a processor module 510, and memory 515 (including software (SW) 520), and which each may be in communication, directly or indirectly, with each other (e.g., over bus system 505). The transceiver modules 525 may be configured to communicate bi-directionally, via the antennas 530, with the UEs 115. The transceiver module 525 (and/or other components of the base station 105-a) may also be configured to communicate bi-directionally, via the antennas 530, with one or more other base stations (not shown). The transceiver module 525 may include a modem configured to modulate the packets and provide the modulated packets to the antennas 530 for transmission, and to demodulate packets received from the antennas 530. The modulation and/or demodulation may be done in coordination with the signal processing module 210-c. The base station 105-c may include multiple transceiver modules 525, each with one or more associated antennas 530. The transceiver module may incorporate aspects of the receiver 205 and/or transmitter 215 with reference to FIGS. 2-4.

The memory 515 may include random access memory (RAM) and read-only memory (ROM). The memory 515 may also store computer-readable, computer-executable software code 520 containing instructions that are configured to, when executed, cause the processor module 510 to perform various functions described herein (e.g., signal processing, call processing, database management, message routing, etc.). Alternatively, the software 520 may not be directly executable by the processor module 510 but be configured to cause the computer, e.g., when compiled and executed, to perform functions described herein.

The processor module 510 may include an intelligent hardware device, e.g., a central processing unit (CPU), a microcontroller, an application-specific integrated circuit (ASIC), etc. The processor module 510 may include various special purpose processors such as encoders, queue processing modules, base band processors, radio head controllers, digital signal processors (DSPs), and the like.

According to the architecture of FIG. 5, the base station 105-a may further include a communications management module 550. The communications management module 550 may manage communications with other base stations 105. The communications management module may include a controller and/or scheduler for controlling communications with UEs 115 in cooperation with other base stations 105. For example, the communications management module 550 may perform scheduling for transmissions to UEs 115 and/or various interference mitigation techniques such as beamforming and/or joint transmission.

Figure 6:
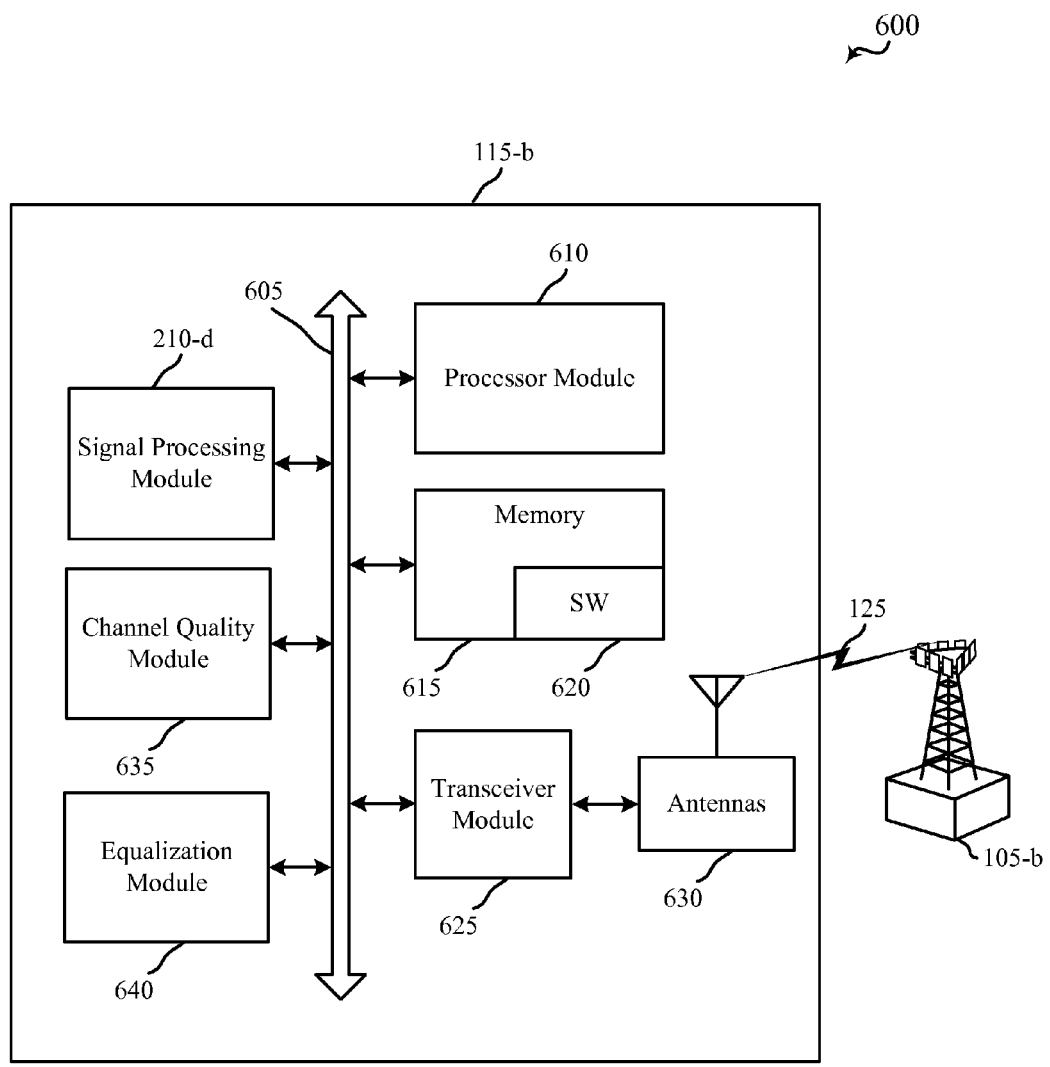
FIG. 6 shows an example of a mobile device configured for communication using orthogonal modulation in accordance with various embodiments.

Turning next to FIG. 6, which shows a block diagram 600 of an example UE 115-b configured for communication using orthogonal modulation in accordance with various embodiments. The UE 115-b may have an internal power supply (not shown), such as a small battery, to facilitate mobile operation. In some embodiments, the UE 115-b may be an example of the UEs 115 of FIG. 1 and/or devices 220, 220-a and 220-b of FIGS. 2-4.

The UE 115-b may generally include components for bi-directional voice and data communications including components for transmitting communications and components for receiving communications. The UE 115-b may include antenna(s) 630, a transceiver module 625, a processor module 610, and memory 615 (including software (SW) 620), which each may communicate, directly or indirectly, with each other (e.g., via one or more buses 605). The transceiver module 625 may be configured to communicate bi-directionally, via the antenna(s) 630 and/or one or more wired or wireless links, with one or more networks, as described above. For example, the transceiver module 625 may be configured to communicate bi-directionally with base stations 105 of FIG. 1. The transceiver module 625 may include a modem configured to modulate the packets and provide the modulated packets to the antenna(s) 630 for transmission, and to demodulate packets received from the antenna(s) 630. While the UE 115-b may include a single antenna 630, the UE 115-b may have multiple antennas 630 capable of concurrently transmitting and/or receiving multiple wireless transmissions. The transceiver module 625 may be capable of concurrently communicating with multiple base stations 105 via multiple component carriers.

The UE 115-b may also include a channel quality module 635 that may be used to estimate the quality of a transmission link 125 with base station 105-b. Channel estimation may involve receiving a constant modulation value for some offset (e.g., 0). This may be a pilot signal. The modulation values may be zero for all indices whose time shifts are N before and N after the pilot, for some pre-determined value N. This ensures that the N offsets following the pilot only contain multipath delays of the pilot. The offset may be time-reversed, so that a channel delay results in an earlier shift of a data sequence.

The UE 115-b may also include an equalization module 640. The equalization module 640 may be means for equalizing received channels. Based on the cyclic prefix, a multipath delay may have the effect of multiplying the transmit signal by a circulant matrix M according to Equation 6 above. If the delay is nonzero and of length <N, M may have column rank at least the dimension of M, minus N−1. If the last N offsets are spaced with a guard, the last N−1 columns of M may be irrelevant. If L is defined as all but the last N−1 columns of M, then a least-squares estimate of the transmitted signal may be given by Equation 7.

The memory 615 may include random access memory (RAM) and read-only memory (ROM). The memory 615 may store computer-readable, computer-executable software/firmware code 620 containing instructions that are configured to, when executed, cause the processor module 610 to perform various functions described herein (e.g., call processing, database management, capture of handover delay, etc.). Alternatively, the software/firmware code 620 may not be directly executable by the processor module 610 but be configured to cause a computer (e.g., when compiled and executed) to perform functions described herein.

The processor module 610 may include an intelligent hardware device, e.g., a central processing unit (CPU), a microcontroller, an application-specific integrated circuit (ASIC), etc. The UE 115-*b* may include a speech encoder (not shown) configured to receive audio via a microphone, convert the audio into packets (e.g., 20 ms in length, 30 ms in length, etc.) representative of the received audio, provide the audio packets to the transceiver module 625, and provide indications of whether a user is speaking.

According to the architecture of FIG. 6, the UE 115-*b* may further include a signal processing module 210-*d*. Alternatively, functionality of these modules may be implemented as a component of the transceiver module 625, as a computer program product, and/or as one or more controller elements of the processor module 610.

Figure 7:
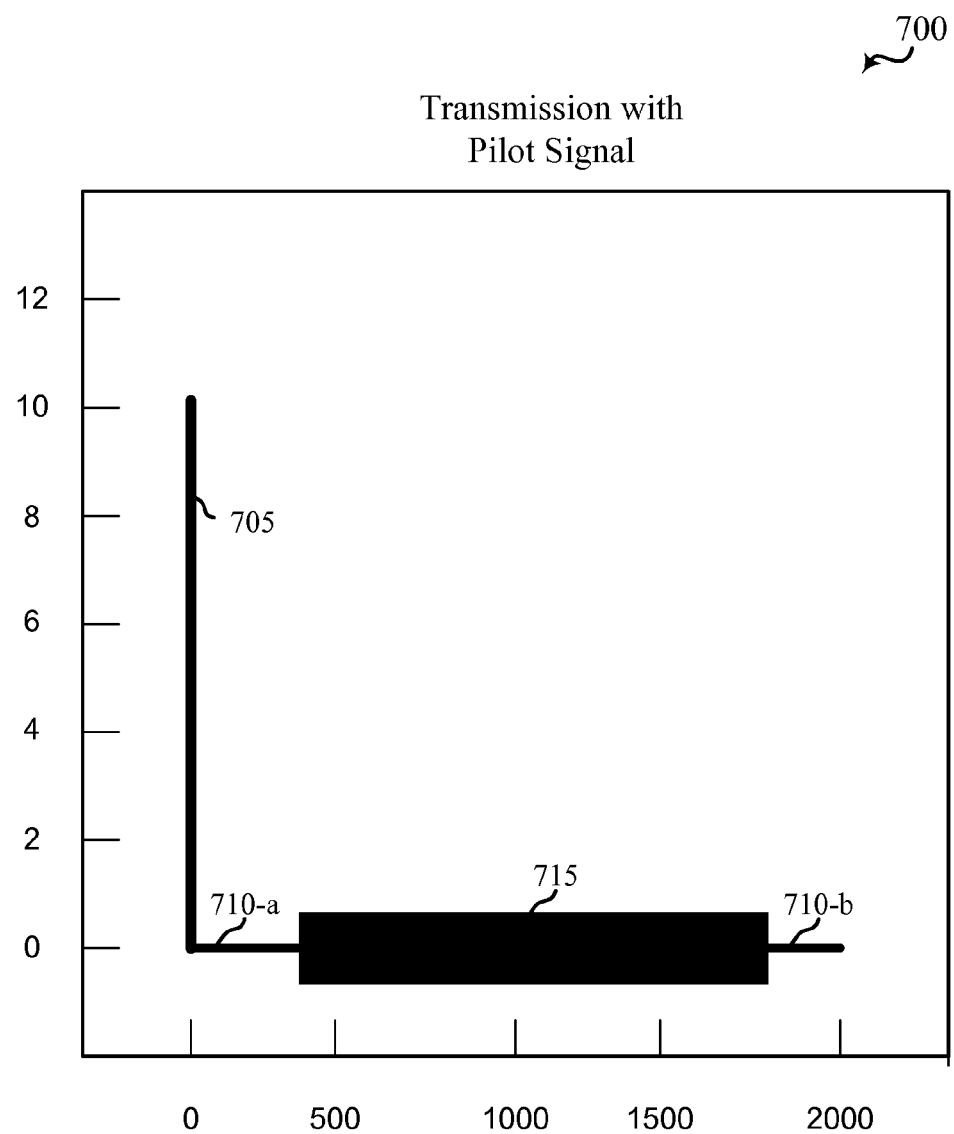
FIG. 7 shows a diagram of a transmission including a pilot signal in accordance with various embodiments.

Turning next to FIG. 7, a diagram 700 illustrates an example of a transmission including a pilot signal 705 in accordance with various embodiments. It also shows guard bands 710-*a* and 710-*b* placed before and after the data transmission 715. In some cases, a cyclic prefix is transmitted in the space occupied by the guard bands 710-*a* and/or 710-*b*. The pilot signal may be transmitted at an offset from the data sequence. For example, diagram 700 shows the pilot signal transmitted at a time offset labeled 0. The offset may correspond to the length of the guard bands 710-*a* and 710-*b*. In one embodiment, a cyclic prefix is transmitted in the guard bands 710-*a* and/or 710-*b*. In this case, the offset may correspond to the length of the cyclic prefix. In some cases, diagram 700 may represent the transmission of a data sequence and a pilot signal without multipath propagation. In another case, diagram 700 may represent a received signal that has been equalized to compensate for multipath propagation.

Figure 8:
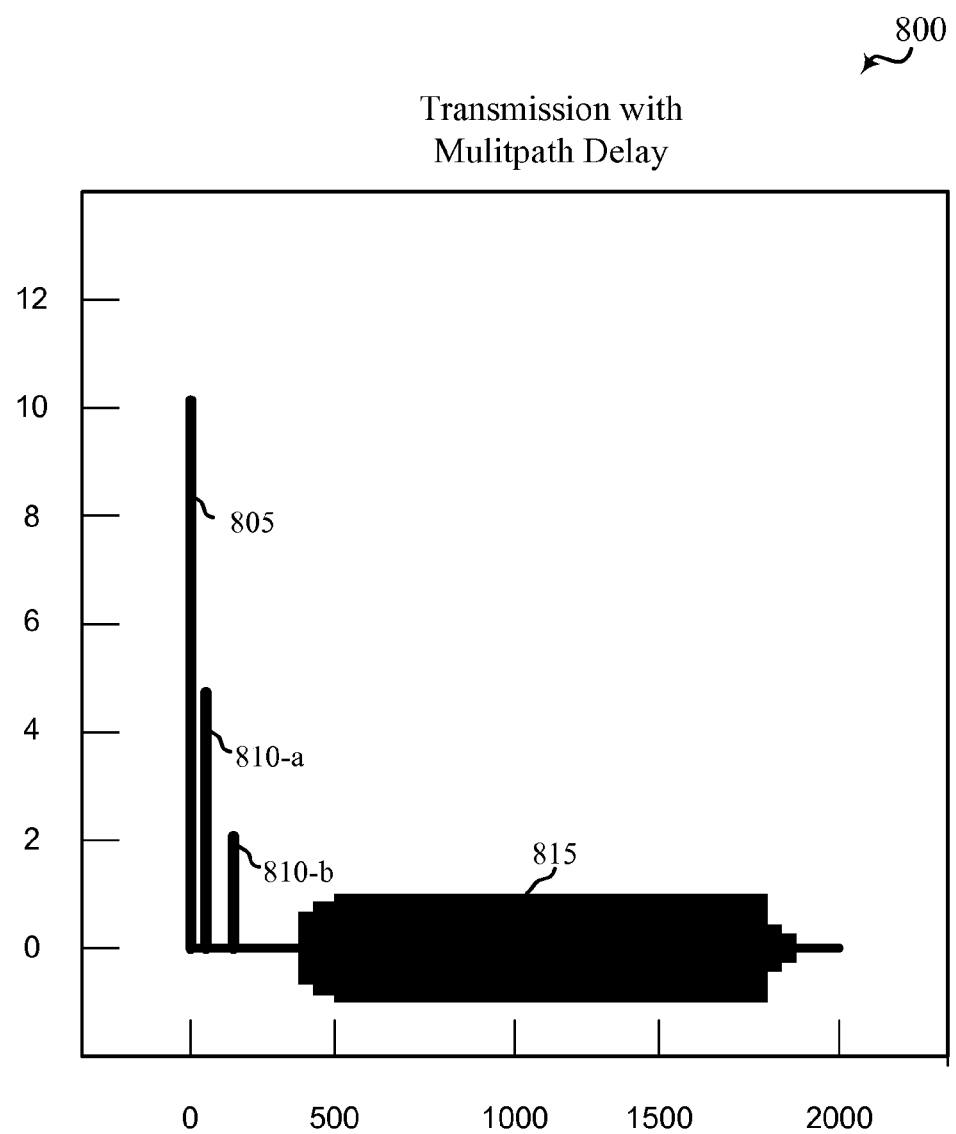
FIG. 8 shows a diagram of a transmission with multipath delay in accordance with various embodiments.

Turning next to FIG. 8, a diagram 800 illustrates an example of a transmission with multipath delay in accordance with various embodiments. A pilot signal 805 is received in addition to data sequence 815. Due to the multipath delay, copies 810-*a* and 810-*b* of the pilot signal may be received subsequent to receiving the pilot signal 805 that arrived via the most direct path. For example, pilot signal 805 may be transmitted via line of sight, and copies 810-*a* and 810-*b* may be received after being reflected off of a building. Due to the multipath propagation, the data sequence 815 may be distorted. For example, delayed symbols may interfere with symbols transmitted earlier but which arrive at the receiver at the same time as the delayed symbols.

In some cases, the time delay between the reception of the pilot signal 805 and the delayed copies 810-*a* and 810-*b* may be used by an equalization module 640, or another component of a device receiving the transmission to estimate and compensate for the multipath propagation. After equalization, the data sequence 815 may be equalized to appear as if there were no multipath propagation as in FIG. 7, or to achieve other desired channel qualities.

Figure 9:
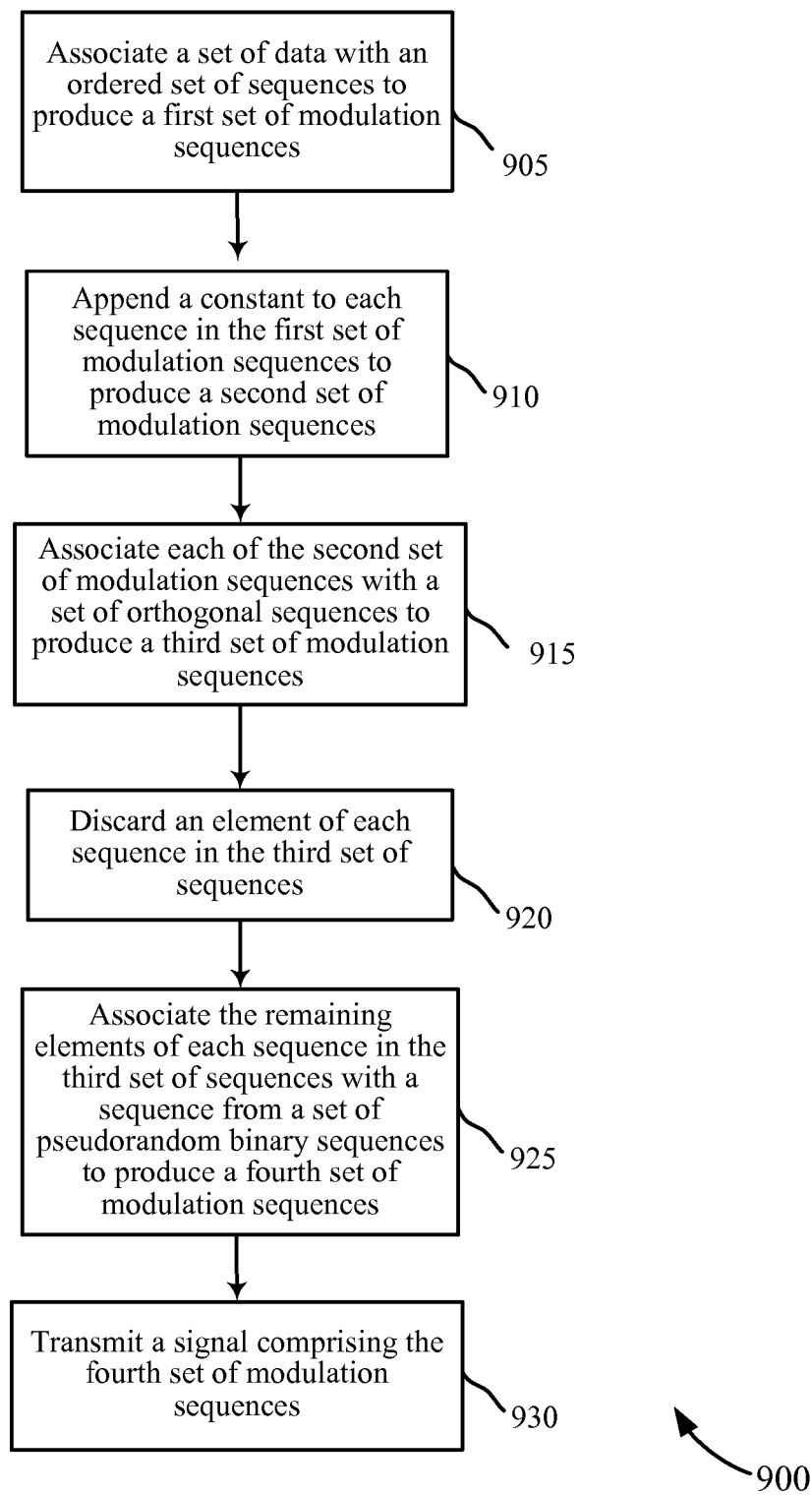
FIG. 9 shows a flowchart of a method for transmission using orthogonal modulation in accordance with various embodiments.

Turning next to FIG. 9, a flowchart 900 illustrates a method for transmission using orthogonal modulation in accordance with various embodiments. The processes described by flowchart 900 may be carried out by components of a base station 105, a UE 115, and/or a device 220 with reference to FIGS. 1-6.

At block 905, the data sequencing module 305 may associate a set of data with an ordered set of sequences to produce a first set of modulation sequences. The association may include applying a modulation scheme such as quadrature phase-shift keying (QPSK), quadrature amplitude modulation (QAM) or another modulation scheme. Each sequence in the ordered set of sequences may have the same number of elements. In one embodiment, the sequences have $2^n-1$ elements for some positive integer n.

At block 910, the appending module 310 may append a constant to each sequence in the first set of modulation sequences to produce a second set of modulation sequences. In an embodiment, the resulting sequences may then have $2^n$ elements.

At block 915, the orthogonal sequence module 315 may associate each of the second set of modulation sequences with a set of orthogonal sequences to produce a third set of modulation sequences. In one embodiment, the orthogonal sequence module 315 may apply a Hadamard transform to each of the second set of modulation sequences to produce the third set of modulation sequences.

At block 920, the discarding module 320 may discard an element of each sequence in the third set of modulation sequences. In one embodiment, the sequences will have $2^n-1$ elements again after this element is discarded. The discarded element may be constant for all of the sequences. For example, an amplitude value of zero at the beginning of each sequence may be discarded.

At block 925, the PBS module 325 may associate the remaining elements of each sequence in the third set of modulation sequences with a sequence from a set of pseudorandom binary sequences to produce a fourth set of modulation sequences. The set of pseudorandom binary sequences may comprise a set of cyclic shift invariant sequences. In one embodiment, the set of pseudorandom binary sequences comprises a set of maximal length sequences.

At block 930, the transmitter 215 may transmit a signal comprising the fourth set of modulation sequences. In some cases, the transmitted signal may be a broadcast signal. In some cases, the signal is transmitted using more than one antenna.

Figure 10:
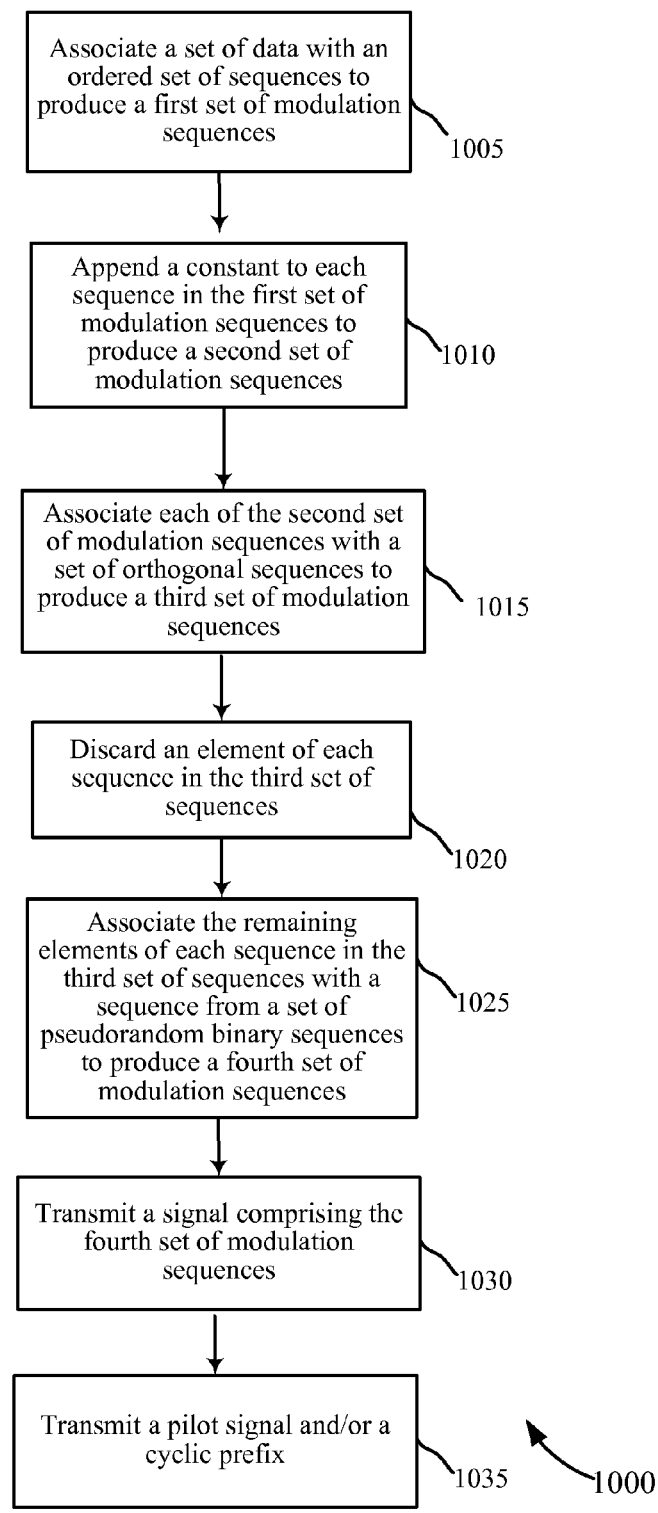
FIG. 10 shows a flowchart of a method for transmission using orthogonal modulation in accordance with various embodiments.

Turning next to FIG. 10, a flowchart 1000 illustrates a method for transmission using orthogonal modulation in accordance with various embodiments. The processes described by flowchart 1000 may be carried out by components of a base station 105, a UE 115, and/or a device 220 with reference to FIGS. 1-6. The processes of flowchart 1000 may also incorporate aspects of the corresponding processes from flowchart 900 of FIG. 9.

At block 1005, the data sequencing module 305 may associate a set of data with an ordered set of sequences to produce a first set of modulation sequences. This may include the use of a modulation scheme such as QPSK, QAM, or some other modulation scheme. At block 1010, the appending module 310 may append a constant to each sequence in the first set of modulation sequences to produce a second set of modulation sequences. At block 1015, the orthogonal sequence module 315 may associate each of the second set of modulation sequences with a set of orthogonal sequences to produce a third set of modulation sequences. At block 1020, the discarding module 320 may discard an element of each sequence in the third set of modulation sequences. At block 1025, the PBS module 325 may associate the remaining elements of each sequence in the third set of modulation sequences with a sequence from a set of pseudorandom binary sequences to produce a fourth set of modulation sequences. At block 1030, the transmitter 215 may transmit a signal comprising the fourth set of modulation sequences.

At block 1035, the transmitter 215 may transmit a pilot signal and/or a cyclic prefix. In some cases, the pilot signal may be configured for channel estimation, and may be transmitted at an offset. The offset may be based at least in part on the length of the cyclic prefix, a length determined by a guard band between transmissions, or both.

Figure 11:
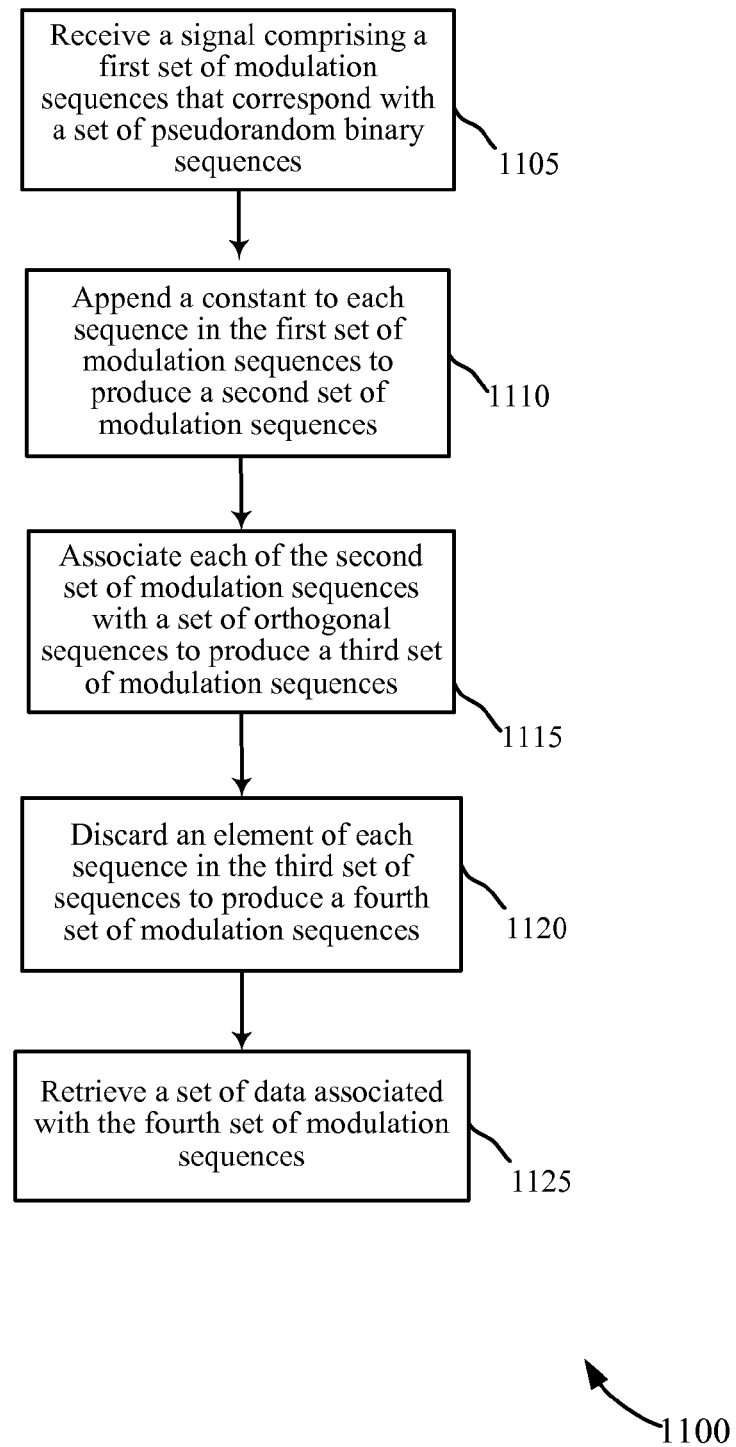
FIG. 11 shows a flowchart of a method for receiving communication using orthogonal modulation in accordance with various embodiments.

Turning next to FIG. 11, a flowchart 1100 illustrates a method for receiving communication using orthogonal modulation in accordance with various embodiments. The processes described by flowchart 1100 may be carried out by components of a base station 105, a UE 115, and/or a device 220 with reference to FIGS. 1-6.

At block 1105, the receiver 205 may receive a signal comprising a first set of modulation sequences that correspond with a set of pseudorandom binary sequences. In one embodiment, the sequences are maximal length sequences. The sequences may then be reordered by reordering module 405. Each sequence in the reordered set of sequences may have the same number of elements. In one embodiment, the sequences have $2^n-1$ elements for some positive integer n. In some cases the signal is received using more than one antenna. The signal may be a broadcast signal, or it may be a signal directed to a specific user.

At block 1110, the appending module 410 may append a constant to each sequence in the first set of modulation sequences to produce a second set of modulation sequences. In an embodiment, the resulting sequences may then have $2^n$ elements.

At block 1115, the orthogonal sequence module 415 may associate each of the second set of modulation sequences with a set of orthogonal sequences to produce a third set of modulation sequences. In one embodiment, the orthogonal sequence module 415 may apply a Hadamard transform to each of the second set of modulation sequences to produce the third set of modulation sequences.

At block 1120, the discarding module 420 may discard an element of each sequence in the third set of modulation sequences to produce a fourth set of modulation sequences. At block 1125, the data retrieval module 425 may retrieve a set of data associated with the fourth set of modulation sequences. The retrieved data may be control data or it may be for a user application.

Figure 12:
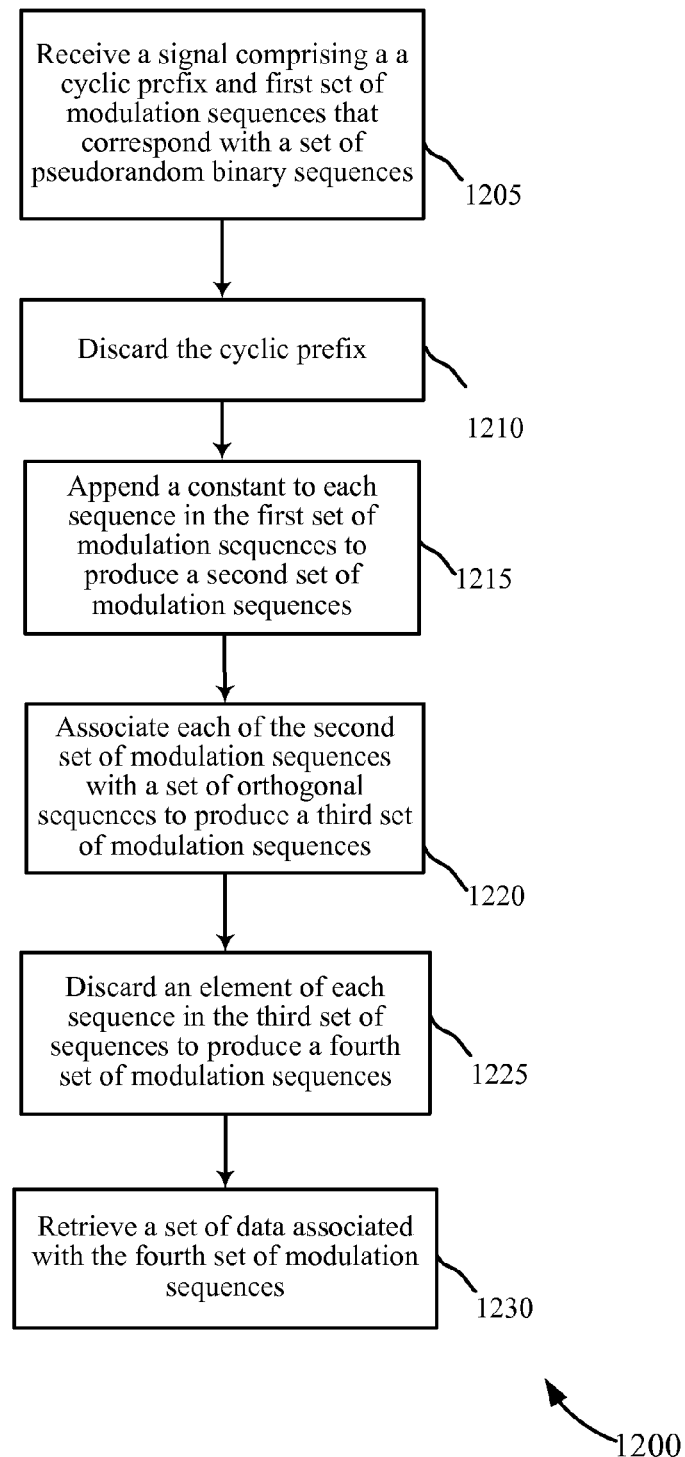
FIG. 12 shows a flowchart of a method for receiving communication using orthogonal modulation in accordance with various embodiments.

Turning next to FIG. 12, a flowchart 1200 illustrates a method for receiving communication using orthogonal modulation in accordance with various embodiments. The processes described by flowchart 1200 may be carried out by components of a base station 105, a UE 115, and/or a device 220 with reference to FIGS. 1-6. The processes of flowchart 1200 may also incorporate aspects of the corresponding processes from flowchart 1100 of FIG. 11.

At block 1205, the receiver 205 may receive a signal comprising a cyclic prefix and first set of modulation sequences that correspond with a set of pseudorandom binary sequences. The cyclic prefix may correspond in length to a guard between transmission of data sequences. In some cases, the length of the cyclic prefix corresponds to an offset associated with the transmission of a pilot signal.

At block 1210, the receiver 205 and/or signal processing module may discard the cyclic prefix. The sequences may then be reordered by reordering module 405.

At block 1215, the appending module 410 may append a constant to each sequence in the first set of modulation sequences to produce a second set of modulation sequences. At block 1220, the orthogonal sequence module 415 may associate each of the second set of modulation sequences with a set of orthogonal sequences to produce a third set of modulation sequences. At block 1225, the discarding module 420 may discard an element of each sequence in the third set of modulation sequences to produce a fourth set of modulation sequences. At block 1230, the data retrieval module 425 may retrieve a set of data associated with the fourth set of modulation sequences.

Figure 13:
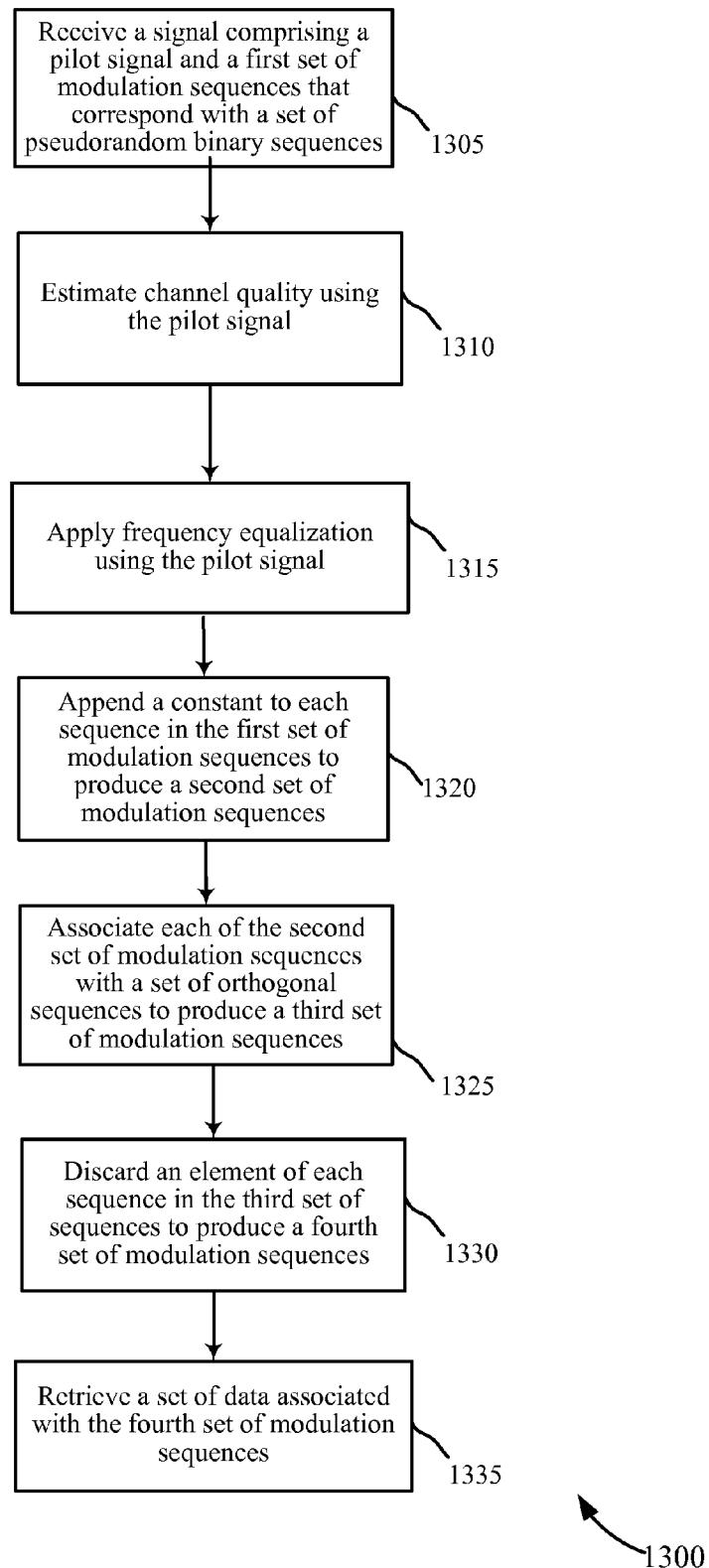
FIG. 13 shows a flowchart of a method for receiving communication using orthogonal modulation in accordance with various embodiments.

Turning next to FIG. 13, a flowchart 1300 illustrates a method for receiving communication using orthogonal modulation in accordance with various embodiments. The processes described by flowchart 1300 may be carried out by components of a base station 105, a UE 115, and/or a device 220 with reference to FIGS. 1-6. The processes of flowchart 1300 may also incorporate aspects of the corresponding processes from flowchart 1100 of FIG. 11.

At block 1305, the receiver 205 may receive a signal comprising a pilot signal and a first set of modulation sequences that correspond with a set of pseudorandom binary sequences. The set of received sequences may be associated with a set that is invariant with respect to cyclic time shifts, and in some cases, it may be associated with a set of maximal length sequences.

At block 1310, the channel quality module 635 may estimate channel quality using the pilot signal. In one embodiment, the channel quality module 635 may measure multipath propagation delay based on receiving delayed copies of a pilot signal. The data sequence may be processed based on a circulant matrix based on the reception of the pilot signal.

At block 1315, the equalization module 640 may apply frequency equalization using the pilot signal. In some cases, applying frequency equalization comprises using a circulant matrix.

At block 1320, the appending module 410 may append a constant to each sequence in the first set of modulation sequences to produce a second set of modulation sequences. At block 1325, the orthogonal sequence module 415 may associate each of the second set of modulation sequences with a set of orthogonal sequences to produce a third set of modulation sequences. At block 1330, the discarding module 420 may discard an element of each sequence in the third set of modulation sequences to produce a fourth set of modulation sequences. At block 1335, the data retrieval module 425 may retrieve a set of data associated with the fourth set of modulation sequences.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of wireless communication using orthogonal modulation, comprising:
    associating a set of data with an ordered set of sequences to produce a first set of modulation sequences for a wireless signal;
    appending a constant to each sequence in the first set of modulation sequences to produce a second set of modulation sequences for the wireless signal;
    associating each of the second set of modulation sequences with a set of orthogonal sequences to produce a third set of modulation sequences for the wireless signal;
    discarding an element of each sequence in the third set of modulation sequences and associating the remaining elements of each sequence in the third set of modulation sequences with a sequence from a set of pseudorandom binary sequences to produce a fourth set of modulation sequences for the wireless signal; and
    transmitting the wireless signal comprising the fourth set of modulation sequences.

2. The method of claim 1, further comprising:
    applying a Hadamard transform to each of the second set of modulation sequences to produce the third set of modulation sequences.

3. The method of claim 1, wherein each sequence in the ordered set of sequences has a same number of elements.

4. The method of claim 1, wherein the set of pseudorandom binary sequences comprises a set of cyclic shift invariant sequences.

5. The method of claim 1, wherein the set of pseudorandom binary sequences comprises a set of maximal length sequences.

6. The method of claim 1, wherein the transmitted wireless signal comprises at least one cyclic prefix.

7. The method of claim 1, wherein the transmitted wireless signal comprises a pilot signal.

8. The method of claim 7, further comprising:
transmitting the pilot signal at an offset for channel estimation.

9. The method of claim 1, wherein each sequence in the ordered set of sequences comprises a number of elements equal to one less than a power of two.

10. The method of claim 1, further comprising:
transmitting the wireless signal using more than one antenna.

11. The method of claim 1, wherein the transmitted wireless signal is a broadcast signal.

12. An apparatus for wireless communication using orthogonal modulation, comprising:
means for associating a set of data with an ordered set of sequences to produce a first set of modulation sequences for a wireless signal;
means for appending a constant to each sequence in the first set of modulation sequences to produce a second set of modulation sequences for the wireless signal;
means for associating each of the second set of modulation sequences with a set of orthogonal sequences to produce a third set of modulation sequences for the wireless signal;
means for discarding an element of each sequence in the third set of modulation sequences and means for associating the remaining elements of each sequence in the third set of modulation sequences with a sequence from a set of pseudorandom binary sequences to produce a fourth set of modulation sequences for the wireless signal; and
means for transmitting the wireless signal comprising the fourth set of modulation sequences.

13. The apparatus of claim 12, further comprising:
means for applying a Hadamard transform to each of the second set of modulation sequences to produce the third set of modulation sequences.

14. The apparatus of claim 12, wherein each sequence in the ordered set of sequences has a same number of elements.

15. The apparatus of claim 12, wherein the set of pseudorandom binary sequences comprises a set of cyclic shift invariant sequences.

16. An apparatus for wireless communication using orthogonal modulation, comprising:
a processor;
memory in electronic communication with the processor; and
instructions stored in the memory, the instructions being executable by the processor to:
associate a set of data with an ordered set of sequences to produce a first set of modulation sequences for a wireless signal;
append a constant to each sequence in the first set of modulation sequences to produce a second set of modulation sequences for the wireless signal;
associate each of the second set of modulation sequences with a set of orthogonal sequences to produce a third set of modulation sequences for the wireless signal;
discard an element of each sequence in the third set of modulation sequences and associate the remaining elements of each sequence in the third set of modulation sequences with a sequence from a set of pseudorandom binary sequences to produce a fourth set of modulation sequences for the wireless signal; and
transmit the wireless signal comprising the fourth set of modulation sequences.

17. The apparatus of claim 16, further comprising instructions being executable to:
apply a Hadamard transform to each of the second set of modulation sequences to produce the third set of modulation sequences.

18. The apparatus of claim 16, wherein the set of pseudorandom binary sequences comprises a set of maximal length sequences.

* * * * *